(12) United States Patent  
Liu et al.

(10) Patent No.: US 11,163,373 B2
(45) Date of Patent: Nov. 2, 2021

(54) METHOD AND ELECTRONIC DEVICE OF GESTURE RECOGNITION

(71) Applicant: Beijing Dajia Internet Information Technology Co., Ltd., Beijing (CN)

(72) Inventors: Yufeng Liu, Beijing (CN); Wen Zheng, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/139,369

(22) Filed: Dec. 31, 2020

(65) Prior Publication Data
US 2021/0124425 A1 Apr. 29, 2021

Related U.S. Application Data

(63) Continuation of application No. PCT/CN2019/128029, filed on Dec. 24, 2019.

(30) Foreign Application Priority Data

Jan. 4, 2019 (CN) .......................... 201910009529.2

(51) Int. Cl.
*G06F 3/01* (2006.01)
*G06T 7/73* (2017.01)
(Continued)

(52) U.S. Cl.
CPC ......... *G06F 3/017* (2013.01); *G06K 9/00201* (2013.01); *G06K 9/00355* (2013.01);
(Continued)

(58) Field of Classification Search
CPC ............... G06K 9/6256; G06K 9/6215; G06K 9/00375; G06K 9/00355; G06K 9/00201; G06T 7/74; G06F 3/017
See application file for complete search history.

(56) References Cited

U.S. PATENT DOCUMENTS 6,546,309 B1* 4/2003 Gazzuolo ........... G06Q 30/0601
33/512
9,619,748 B1* 4/2017 Commons ................ G06N 3/08
(Continued)

FOREIGN PATENT DOCUMENTS

CN 103577793 A 2/2014
CN 104598915 A 5/2015
(Continued)

OTHER PUBLICATIONS

International Search Report for International Application No. PCT/CN2019/128029 dated Mar. 23, 2020.
(Continued)

*Primary Examiner* — Mia M Thomas
(74) *Attorney, Agent, or Firm* — Meunier Carlin & Curfman LLC

(57) ABSTRACT

Disclosed are a method, an electronic device, and a storage medium of gesture recognition. The method includes: acquiring a hand image; extracting a first standard feature of a hand in the hand image based on a feature mapping model; the feature mapping model being obtained by training based on second standard features of hands in a synthesized image sample and a real image sample; obtaining three-dimensional coordinates of multiple key points of the hand by processing the first standard feature; determining a gesture of the hand based on the three-dimensional coordinates of the multiple key points

18 Claims, 5 Drawing Sheets

Obtaining first pixel coordinates and first depth coordinates of multiple key points of the hand by processing the first standard feature based on a coordinate regression model, the coordinate regression model being obtained through pre-training, and the first depth coordinates being normalized relative depths — S301

Obtaining three-dimensional coordinates of each key point based on a first pixel coordinate and a first depth coordinate of each key point as well as preset camera parameters and root node coordinates — S302

(51) Int. Cl.
*G06K 9/00* (2006.01)
*G06K 9/62* (2006.01)

(52) U.S. Cl.
CPC ....... *G06K 9/00375* (2013.01); *G06K 9/6215* (2013.01); *G06K 9/6256* (2013.01); *G06T 7/74* (2017.01); *G06T 2207/10028* (2013.01); *G06T 2207/20081* (2013.01)

(56) References Cited

U.S. PATENT DOCUMENTS

| | | | |
|---|---|---|---|
| 2011/0110560 A1* | 5/2011 | Adhikari | G06T 7/246 382/103 |
| 2011/0298897 A1* | 12/2011 | Sareen | G06T 19/00 348/47 |
| 2013/0050432 A1* | 2/2013 | Perez | G06F 3/017 348/47 |
| 2013/0343610 A1* | 12/2013 | Dal Mutto | G06K 9/00355 382/103 |
| 2014/0328516 A1* | 11/2014 | Li | G06K 9/4642 382/103 |
| 2015/0378444 A1 | 12/2015 | Yin et al. | |
| 2016/0148079 A1* | 5/2016 | Shen | G06N 3/0454 382/157 |
| 2017/0206405 A1* | 7/2017 | Molchanov | G06K 9/00355 |
| 2017/0206691 A1* | 7/2017 | Harrises | G02B 27/0172 |
| 2017/0285345 A1* | 10/2017 | Ferens | G06F 1/163 |
| 2018/0018533 A1 | 1/2018 | Taranta, II et al. | |
| 2018/0053056 A1* | 2/2018 | Rabinovich | G06N 3/0445 |
| 2018/0329512 A1* | 11/2018 | Liao | G06F 3/167 |
| 2019/0130275 A1* | 5/2019 | Chen | G06N 3/0454 |
| 2019/0243458 A1* | 8/2019 | Wang | G01S 13/89 |
| 2019/0384407 A1* | 12/2019 | Smith | G06K 9/00389 |
| 2019/0384408 A1* | 12/2019 | Iyer | G06F 3/017 |
| 2020/0132474 A1* | 4/2020 | Comer | G06F 3/013 |
| 2020/0162274 A1* | 5/2020 | Iyer | G06F 3/0346 |
| 2020/0225742 A1* | 7/2020 | Krishnakumar | H04N 5/23293 |
| 2020/0357174 A1* | 11/2020 | Banerjee | G06F 3/0304 |
| 2020/0372246 A1* | 11/2020 | Chidananda | G06F 3/017 |

FOREIGN PATENT DOCUMENTS

| | | |
|---|---|---|
| CN | 105425964 A | 3/2016 |
| CN | 107103613 A | 8/2017 |
| CN | 107273871 A | 10/2017 |
| CN | 107463326 A | 12/2017 |
| CN | 107766842 A | 3/2018 |
| CN | 108062526 A | 5/2018 |
| CN | 108229318 A | 6/2018 |
| CN | 108256504 A | 7/2018 |
| CN | 109858524 A | 6/2019 |

OTHER PUBLICATIONS

Research on Gesture Recognition Technology in the Human-computer Interaction, Master Thesis Xidian University, 83 pages.
Decision to Grant for Chinese Application No. 201910009529.2 dated Sep. 15, 2020.
First Office Action for Chinese Application No. 201910009529.2 dated Jul. 21, 2020.

* cited by examiner

METHOD AND ELECTRONIC DEVICE OF GESTURE RECOGNITION

CROSS-REFERENCE OF RELATED APPLICATIONS

The application is the continuation application of International Application No. PCT/CN2019/128029, filed on Dec. 24, 2019, which is based upon and claims the priority from Chinese Patent Application No. 201910009529.2, filed with the China National Intellectual Property Administration on Jan. 4, 2019 and entitled "Method, Apparatus, Electronic Device, and Storage Medium of Gesture Recognition", which is hereby incorporated by reference in its entirety.

FIELD

The disclosure relates to the field of computer technology, and in particular to a method, apparatus device, electronic device and storage medium of gesture recognition.

BACKGROUND

Gesture recognition is based on hand pose estimation, which refers to predicting the three-dimensional coordinates of key points of a hand in an image containing the hand. In the existing hand pose estimation technology, the self-occlusion problem due to the depth ambiguity (multiple three-dimensional coordinates can be mapped to the same two-dimensional coordinate) and the flexible and changeable hand pose is very serious, so that it is very difficult to label the three-dimensional key points directly on the image, leading to a hand data set in real situations without three-dimensional coordinate label. With the development of rendering technology, the number of hand images synthesized by the renderer is often sufficient and they are well-labeled, but the differences in the skin and background between the synthesized hand and the real hand are relatively large, so the generalization ability of the gesture recognition model obtained by training based on only the synthetic data set is relatively poor.

In order to reduce the difficulty in labeling real images, a weakly-supervised hand pose estimation method is usually adopted, to improve the accuracy of real scene pose estimation by jointly training based on the synthetic data and real data. The existing weakly-supervised hand pose estimation method may learn the mapping relationship from 2D to 3D through the synthetic data, and apply this relationship to real scenes. Also, it uses the easily-obtained depth map to constrain the range of depth prediction and reduce the impact of depth ambiguity. However, the inventors found that the difference between the synthetic data and real data is relatively large and only the depth map constraint is not enough to eliminate this difference, leading to a limited improvement in the accuracy of the three-dimensional pose estimation.

SUMMARY

The application provides a method, apparatus, electronic device and storage medium of gesture recognition.

According to a first aspect of the application, a method of gesture recognition is provided, which includes:
acquiring a hand image;
extracting a first standard feature of a hand in the hand image based on a feature mapping model; the feature mapping model being obtained by pre-training based on second standard features of hands in a synthesized image sample and a real image sample;
obtaining three-dimensional coordinates of multiple key points of the hand by processing the first standard feature:
determining a gesture of the hand based on the three-dimensional coordinates of the multiple key points.

According to a second aspect of the application, an apparatus of gesture recognition is provided, which includes:
a first acquisition module for acquiring a hand image;
a feature extraction module for extracting a first standard feature of a hand in the hand image based on a feature mapping model; the feature mapping model being obtained by pre-training based on second standard features of hands in a synthesized image sample and a real image sample;
a coordinate acquisition module for obtaining three-dimensional coordinates of multiple key points of the hand by processing the first standard feature;
a gesture determination module for determining a gesture of the hand based on the three-dimensional coordinates of the multiple key points.

According to a third aspect of the application, an electronic device is provided, which includes:
a processor;
a memory for storing instructions that can be executed by the processor;
wherein the processor is configured to perform the gesture recognition method as described in the first aspect.

According to a fourth aspect of the application, a non-transitory computer-readable storage medium is provided. When the instructions in the storage medium are executed by a processor of an electronic device, the electronic device can perform the gesture recognition method as described in the first aspect.

According to a fifth aspect of the application, a computer program product is provided. When the instructions in the computer program product are executed by a processor of an electronic device, the electronic device can perform the gesture recognition method as described in the first aspect.

It should be understood that the above general description and the following detailed description are only exemplary and illustrative, and cannot limit the application.

BRIEF DESCRIPTION OF THE DRAWINGS

The accompanying drawings here are incorporated into and constitute a part of the specification, illustrate the embodiments conforming to the application, and together with the specification, serve to explain the principles of the application.

DETAILED DESCRIPTION OF THE EMBODIMENTS

Figure 1:
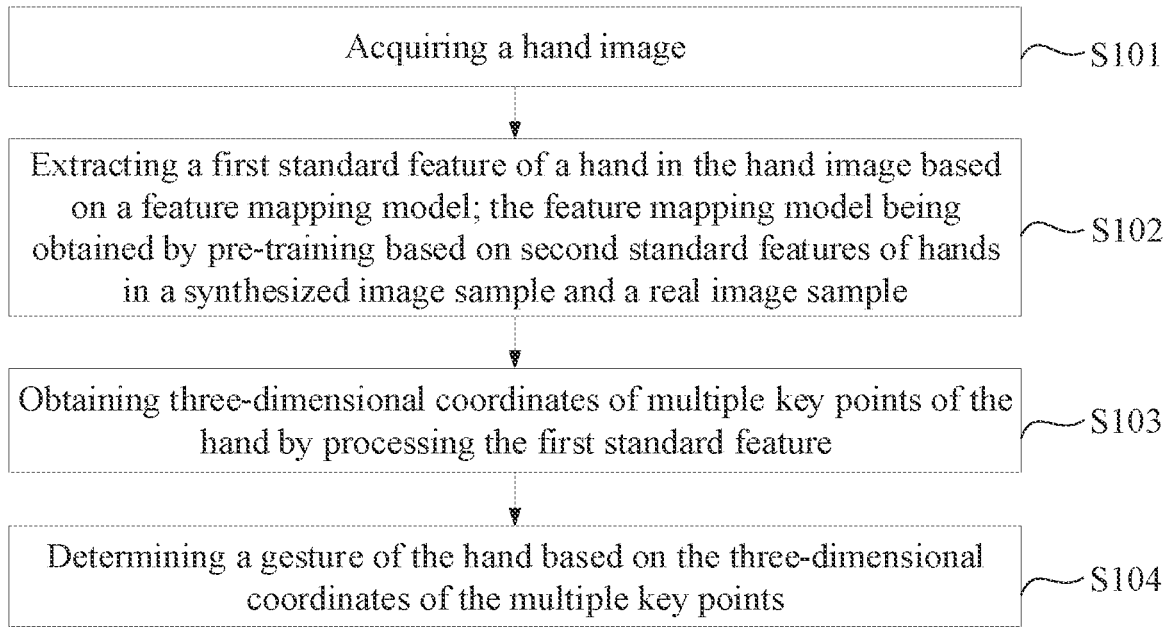
FIG. 1 is a flowchart of a method of gesture recognition according to embodiments of the application.

The exemplary embodiments will be illustrated here in details, and the examples thereof are represented in the drawings. When the following description relates to the drawings, the same numbers represent the same or similar elements in the different drawings, unless otherwise indicated. The implementation modes described in the following exemplary embodiments do not represent all the implementation modes consistent with the application. On the contrary, they are only the examples of the devices and methods which are detailed in the attached claims and consistent with some aspects of the application.

FIG. 1 is a flowchart of a method of gesture recognition according to embodiments of the application. As shown in FIG. 1, this method is applied to an electronic device, and this method includes the following operations.

S101: acquiring a hand image.

Here, the hand image may be a color image or grayscale image including a hand, etc.

S102: extracting a first standard feature of a hand in the hand image based on a feature mapping model; the feature mapping model being obtained by pre-training based on the second standard features of hands in synthesized image samples and real image samples.

The first standard feature of the hand can be output by inputting the hand image into the pre-trained feature mapping model, where the first standard feature may include at least one of common hand features such as hand skeleton structure, relative length of hand skeleton and the like.

The training of the feature mapping model may be, for example, to firstly extract the first feature of the synthesized image sample and the second feature of the real image sample, determine the second standard feature based on the distance between the first feature and the second feature, and obtaining the feature mapping model by training based on the second standard feature, the first feature and the second feature. The second standard feature may include at least one of common hand features such as hand skeleton structure, relative length of hand skeleton and the like. The specific training process will be described in detail in subsequent embodiments.

S103: obtaining three-dimensional coordinates of multiple key points of the hand, by processing the first standard feature.

Here, the key points of the hand include palm, wrist, fingertip, etc.

The three-dimensional coordinates of multiple key points of the hand can be determined by processing the first standard feature using the pre-trained model. In some embodiments, for example, the coordinate regression model obtained by pre-training can be used for the processing, to obtain 2.5D coordinates of multiple key points of the hand. The 2.5D coordinates include the pixel coordinates and the normalized relative depth coordinates of the key points. The three-dimensional coordinates of the key points of the hand in the hand image may be restored based on the 2.5D coordinates, known camera parameters and pre-designated root node coordinates, etc. The subsequent embodiments will introduce this implementation in detail.

S104: determining the gesture of the hand based on the three-dimensional coordinates of the key points.

The hand posture can be determined, based on the three-dimensional spatial position information of the key points such as palm, wrist and fingertip.

In the gesture recognition method provided by the embodiments of the application, the feature mapping model is obtained by learning the second standard feature common to the hands in the synthesized image sample and the real image sample through the network in advance, the first standard feature in the hand image is extracted based on the feature mapping model, the three-dimensional coordinates of the key points are obtained by processing the first standard feature, and then the hand gesture is determined.

Figure 2:
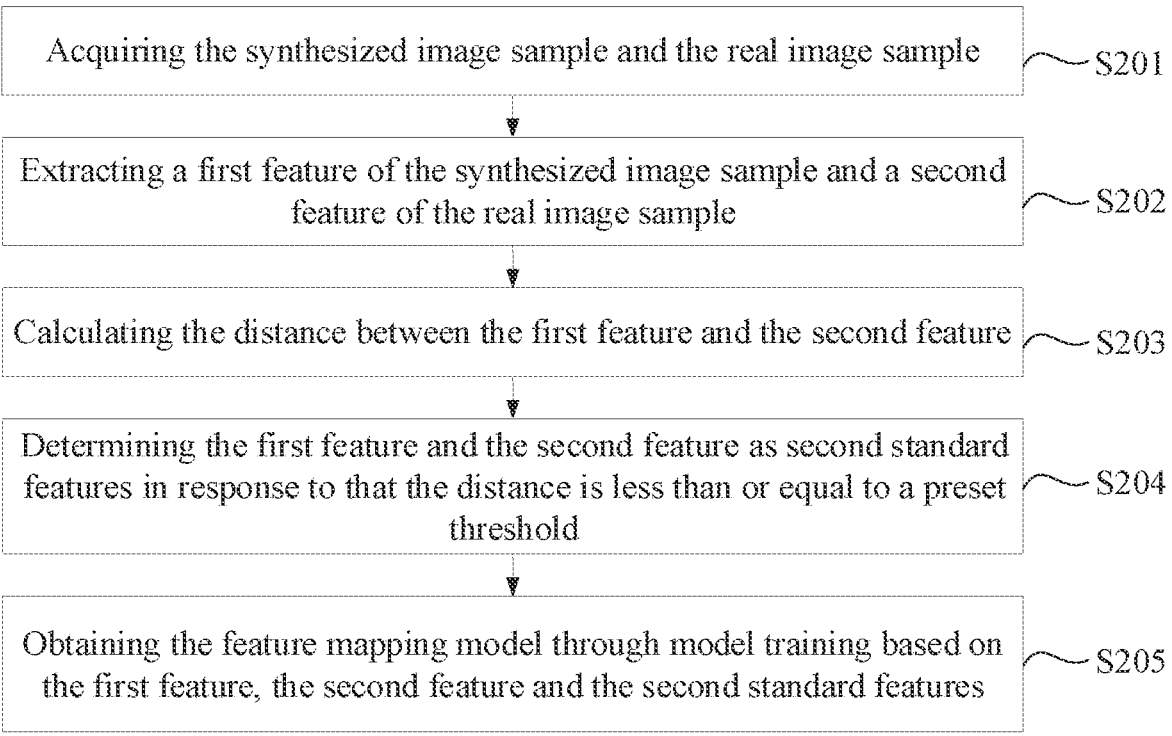
FIG. 2 is a flowchart illustrating the operation of obtaining a feature mapping model according to embodiments of the application.

In some embodiments, before S102, the above method may further include the operation of obtaining the feature mapping model. Referring to FIG. 2, this operation may further include the following.

S201: acquiring the synthesized image sample and the real image sample.

In some embodiments, the synthesized image sample may be a color image or grayscale image containing a hand, which can be synthesized by a renderer. In some embodiments, it is also possible to download a 3D hand model from the Internet and then adjust the pose of the hand model through software to generate different hand pictures. The real image sample may be a color image or grayscale image containing a hand, which can be captured by a camera. The data packet of training samples may include synthesized images by half and real images by half.

S202: extracting a first feature of the synthesized image sample and a second feature of the real image sample.

In some embodiments, the encoder in the self-encoder may be used to extract the first feature and the second feature. Further, in order to reduce the influence of noise, the encoder can also be used to encode the extracted first feature and second feature into a low-dimensional space, thereby filtering the high-dimensional noise.

S203: calculating the distance between the first feature and the second feature.

In some embodiments, a domain classifier may be added to the output of the encoder to close the features of the synthesized image sample and the real image sample, to allow the network to pay attention to and learn the common feature information of two data samples (the synthesized image sample and the real image sample). e.g., the standard features such as the skeleton structure of the hand and the relative length of the hand bone.

In some embodiments, the domain classifier may calculate the wasserstein distance between the first feature and the second feature, and determine whether the first feature and the second feature are similar.

S204: determining the first feature and the second feature as second standard features in response to that the distance is less than or equal to a preset threshold.

In the case that the wasserstein distance is less than or equal to the preset threshold, the domain classifier cannot distinguish between the first feature and the second feature. At this time, it can be confirmed that the first feature and the second feature are the second standard features, to reach the purpose of extracting the common feature information in the synthesized image sample and the real image sample. The magnitude of the preset threshold can be set based on the actual conditions, which is not limited in the application.

S205: obtaining the feature mapping model by model training based on the first feature, the second feature and the second standard features.

The domain classifier is added to the output of the encoder, and the distance between the first feature and the second feature is minimized through minimizing the loss function, where the loss function can update the weight of the encoder through backpropagation to obtain the feature mapping model.

In the method provided by the embodiments of the application, firstly the features of the synthesized image sample and the real image sample can be extracted by an encoder, and can further be encoded from a high-dimensional space to a low-dimensional space to filter out the noise. Then the common features of the two image samples are determined by the domain classifier. Finally the common features (the second standard features) can be input into the decoder of the self-encoder for decoding, and the features in the low-dimensional space can be decoded into the high-dimensional space to facilitate the subsequent module to calculate.

Figure 3:
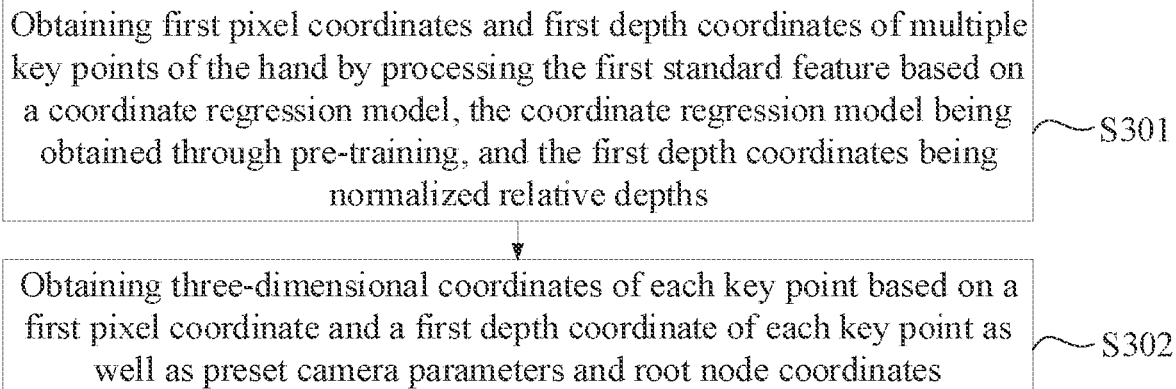
FIG. 3 is a flowchart illustrating the operation of obtaining three-dimensional coordinates of key points according to embodiments of the application.

In some embodiments, referring to FIG. 3, the operation of S103 may include the following.

S301: obtaining the first pixel coordinates and first depth coordinates of multiple key points of the hand, by processing the first standard feature based on a coordinate regression model, where the coordinate regression mode is obtained by pre-training, and the first depth coordinates are normalized relative depths.

The first standard feature is input into the pre-trained coordinate regression model, which can output the 2.5D coordinates P2.5D of multiple key points (such as the palm, wrist, fingertip, etc.) of the hand, including the first pixel coordinate and the first depth coordinate of each key point, as shown in formula (1):

$$P^{2.5D} = \{(x_i, y_i, Z_i^r)\}_{i=0}^{K} \quad (1)$$

where K represents the number of key points, $x_i$ and $y_i$ represent the pixel coordinates of the $i^{th}$ key point, and Z represents the normalized relative depth coordinate of the $i^{th}$ key point, as shown in formula (2):

$$Z_i^r = \frac{C}{S}(Z_i - Z_{root}) \quad (2)$$

where $Z_i$ represents the depth coordinate of the $i^{th}$ key point, i.e., the depth coordinate determined by taking the camera lens as the origin; and $Z_{root}$ is the root node coordinate or reference point coordinate selected artificially. C in the above formula is a constant and usually set to 1, and S is the joint length artificially-selected for normalization.

Here, the training of the coordinate regression model can, for example, obtain the 2.5D coordinates of hand key points in each synthesized image sample and the 2.5D coordinates of hand key points in each real image sample based on the second standard features of the synthesized image samples and the real image samples. Then the neural network model or the like is trained based on the 2.5D coordinates of hand key points in the synthesized image sample, the 2.5D coordinates of hand key points in the real image sample, the three-dimensional coordinates of hand key points marked in the synthesized image sample and the two-dimensional coordinates of hand key points marked in the real image sample, to obtain the coordinate regression model. The subsequent embodiments will introduce the training process of the coordinate regression model in detail.

S302: obtaining three-dimensional coordinates of each key point based on the first pixel coordinate and first depth coordinate of each key point as well as the preset camera parameters and root node coordinates.

For example, the first pixel coordinate and first depth coordinate of each key point as well as the preset camera parameters and root node coordinates can be input into the camera formula (3) to obtain three-dimensional space coordinates of each key point.

$$Z_i \begin{pmatrix} x_i \\ y_i \\ 1 \end{pmatrix} = K \begin{pmatrix} X_i \\ Y_i \\ Z_i \\ 1 \end{pmatrix} \quad (3)$$

where $(X_i, Y_i, Z_i)$ represent the three-dimensional coordinates of the $i^{th}$ key point in the camera space, and $x_i$ and $y_i$ represent the pixel coordinates of the $i^{th}$ key point.

Figure 4:
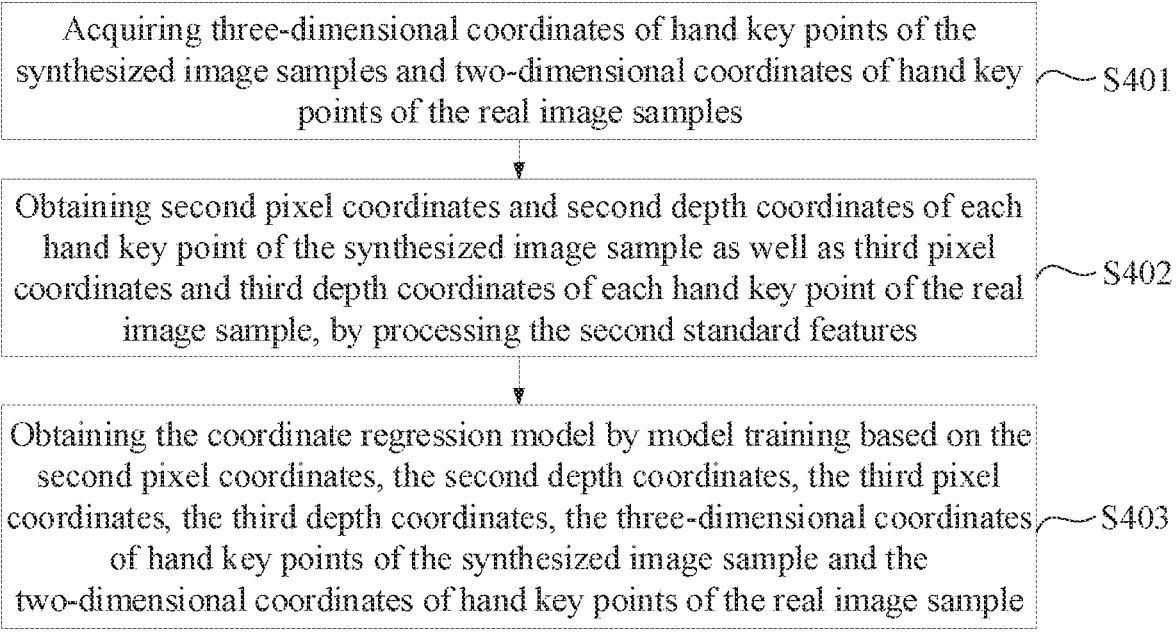
FIG. 4 is a flowchart illustrating the operation of obtaining a coordinate regression model according to embodiments of the application.

Before S301, the method of the above embodiments may further include the operation of obtaining the coordinate regression model. Referring to FIG. 4, this operation may further include the following.

S401: acquiring three-dimensional coordinates of hand key points of the synthesized image samples and two-dimensional coordinates of hand key points of the real image samples.

In some embodiment, the three-dimensional coordinates of multiple hand key points marked in the synthesized image sample and the two-dimensional coordinates of multiple hand key points marked in the real image sample are acquired.

S402: obtaining the second pixel coordinates and second depth coordinates of hand key points of each synthesized image sample, and third pixel coordinates and third depth coordinates of hand key points of each real image sample, by processing the second standard features.

Based on the second standard feature obtained in S204, the two-stack hourglass network model with skip connection (residual connection) is used for processing, and the 2.5D coordinates of hand key points of each synthesized image sample and the 2.5D coordinates of hand key points of each real image sample are obtained through the 2.5D heat map of the hidden variable space output by the network. The 2.5D coordinates of hand key points of each synthesized image sample include the second pixel coordinates and second depth coordinates (normalized relative depths), and the 2.5D coordinates of hand key points of each real image sample include the third pixel coordinates and the third depth coordinates (normalized relative depths). The expression forms of the 2.5D coordinates and normalized relative depth coordinates can refer to formula (1) and formula (2).

S403: obtaining the coordinate regression model by model training based on the second pixel coordinates, the second depth coordinates, the third pixel coordinates, the third depth coordinates, the three-dimensional coordinates of hand key points of the synthesized image samples and the two-dimensional coordinates of hand key points of the real image samples.

The 2.5D coordinates of hand key points of the synthesized image sample can be compared with the three-dimensional coordinates of hand key points marked in the synthesized image sample, and the 2.5D coordinates of hand key points of the real image sample can be compared with the two-dimensional coordinates marked in the real image sample. The difference between the calculated 2.5D coordinates and the marked coordinates is minimized by minimizing the loss function, the parameters in the model are determined by back propagation, and the coordinate regression model is obtained by training.

In order to alleviate the problem of the depth ambiguity in predicting three-dimensional key points through RGB images in weakly-supervised situations, before S403, the method may further include the operation of optimizing the second pixel coordinates, the second depth coordinates, the third pixel coordinates and the third depth coordinates by using a pre-trained coordinate optimization model.

Figure 5:
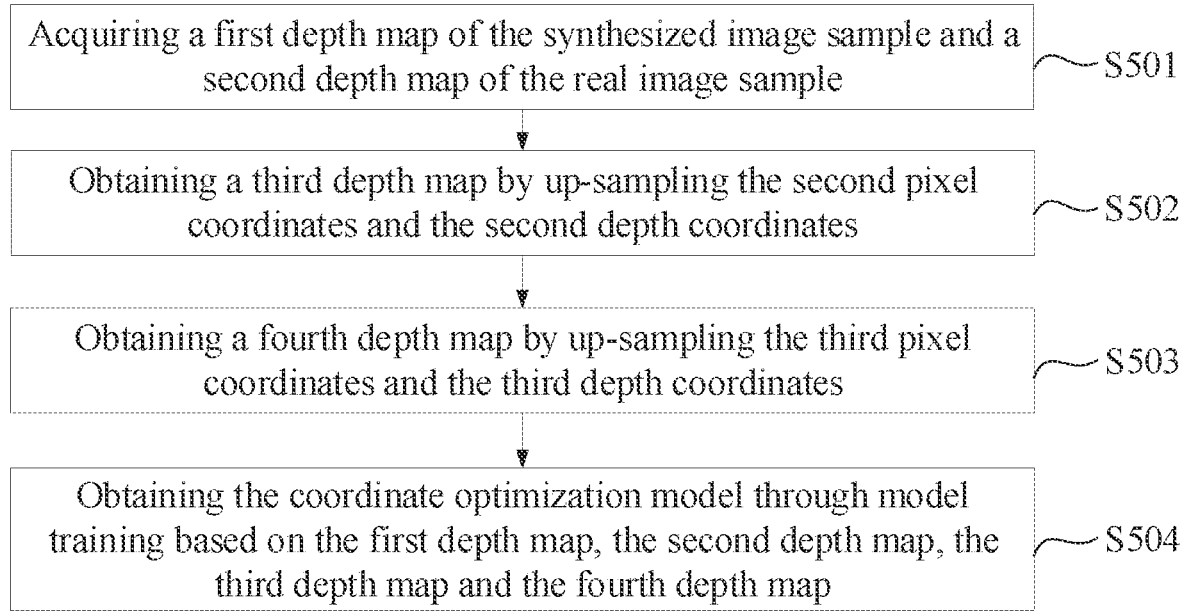
FIG. 5 is a flowchart illustrating the operation of obtaining a coordinate optimization model according to embodiments of the application.

Here, referring to FIG. 5, the operation of obtaining the coordinate optimization model may specifically include the following.

S501: acquiring a first depth map of the synthesized image sample and a second depth map of the real image sample.

Here, the first depth map of the synthesized image sample can be generated by using the hand model information of the synthetic data during the synthetic image generation, and the second depth map of the real image sample can be obtained by shooting with a depth camera.

S502: obtain a third depth map by processing the second pixel coordinates and the second depth coordinates.

For example, the 2.5D coordinates (second pixel coordinates and second depth coordinates) of multiple key points in the synthesized image sample can be processed by using the up-sampling algorithm to obtain the third depth map.

S503: obtaining a fourth depth map by processing the third pixel coordinates and the third depth coordinates.

In some embodiments, the 2.5D coordinates (third pixel coordinates and the third depth coordinates) of multiple key points in the real image sample can be processed by using the up-sampling algorithm to obtain the fourth depth map.

S504: obtaining the coordinate optimization model by model training based on the first depth map, the second depth map, the third depth map and the fourth depth map.

The accurate first depth map of the synthesized image sample can be compared with the predicted third depth map (such as the gray value of each pixel), and the accurate second depth map of the real image sample can be compared with the predicted fourth depth map (such as the gray value of each pixel). The predicted depth map tends to be consistent with the accurate depth map by minimizing the loss function, and the parameters in the up-sampling algorithm are determined by back propagation to obtain the coordinate optimization model.

In the embodiments of the application, in order to alleviate the problem of depth ambiguity in predicting three-dimensional key points through RGB images in the case of weak supervision, the precise depth map constraint is added. That is, the 2.5D coordinates of the hand key points are input into a decoder network to predict the depth map, and then the loss function is optimized based on the difference between the accurate depth map and the predicted depth map, which can constrain the range of depth prediction to a certain extent and solve the problem of depth ambiguity. The usage of the coordinate optimization model provided by this embodiment can improve the accuracy of the 2.5D coordinates of hand key points, and thus improve the accuracy of gesture recognition.

In the method of gesture recognition provided by the embodiments of the application, by adding the domain classifier to the output of the encoder, the distributions of two image samples are drew to be close at the feature level.

Figure 6:
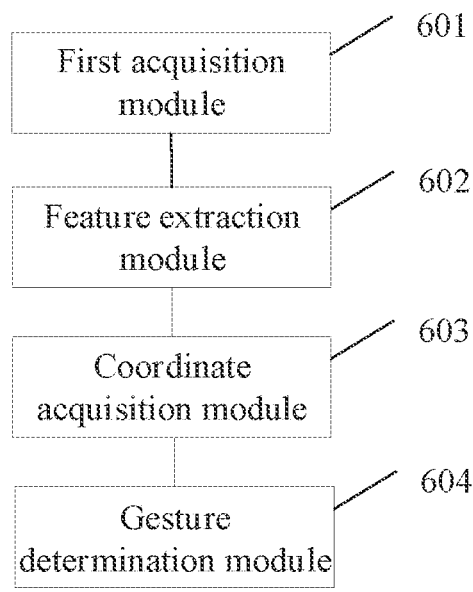
FIG. 6 is a block diagram of an apparatus of gesture recognition according to embodiments of the application.

FIG. 6 is a block diagram of an apparatus of gesture recognition shown in the application. Referring to FIG. 6, this apparatus includes:

a first acquisition module 601 for acquiring a hand image;

a feature extraction module 602 for extracting a first standard feature of a hand in the hand image based on a feature mapping model; the feature mapping model being obtained by pre-training based on second standard features of hands in synthesized image samples and real image samples;

a coordinate acquisition module 603 for obtaining three-dimensional coordinates of multiple key points of the hand by processing the first standard feature;

a gesture determination module 604 for determining a gesture of the hand based on the three-dimensional coordinates of the key points.

In some embodiments, the first standard feature and the second standard feature include at least one of the hand skeleton structure and the relative length of hand skeleton.

In some embodiments, the apparatus further includes: a second acquisition module for obtaining the feature mapping model.

The second acquisition module includes:

a first acquisition unit for acquiring the synthesized image sample and the real image sample;

a feature extraction unit for extracting a first feature of the synthesized image sample and a second feature of the real image sample;

a distance calculation unit for calculating the distance between the first feature and the second feature;

a standard feature unit for determining the first feature and the second feature as second standard features in response to that the distance is less than or equal to a preset threshold:

a first training unit for obtaining the feature mapping model by the model training based on the first feature, the second feature and the second standard features.

In some embodiments, the coordinate acquisition module 603 includes:

a second acquisition unit for obtaining first pixel coordinates and first depth coordinates of multiple key points of the hand by processing the first standard feature based on a coordinate regression model, the coordinate regression model being obtained by pre-training, and the first depth coordinates being normalized relative depths:

a third acquisition unit for obtaining three-dimensional coordinates of each key point based on the first pixel coordinate and the first depth coordinate of each key point as well as the preset camera parameters and root node coordinates.

In some embodiments, the apparatus further includes: a third acquisition module for obtaining the coordinate regression model.

The third acquisition module includes:

a fourth acquisition unit for acquiring three-dimensional coordinates of hand key points of the synthesized image samples and two-dimensional coordinates of hand key points of the real image samples;

a fifth acquisition unit for obtaining second pixel coordinates and second depth coordinates of each hand key point of the synthesized image sample as well as third pixel coordinates and third depth coordinates of each hand key point of the real image sample, by processing the second standard features;

a second training unit for obtaining the coordinate regression model by model training based on the second pixel coordinates, the second depth coordinates, the third pixel coordinates, the third depth coordinates, the three-dimensional coordinates of hand key points of the synthesized image sample and the two-dimensional coordinates of hand key points of the real image sample.

In some embodiments, the third acquisition module further includes:

a coordinate optimization unit for optimizing the second pixel coordinates, the second depth coordinates, the third pixel coordinates and the third depth coordinates based on a pre-trained coordinate optimization model.

In some embodiments, the apparatus further includes: a fourth acquisition module for obtaining the coordinate optimization model.

The fourth acquisition module includes:

a sixth acquisition unit for acquiring a first depth map of the synthesized image sample and a second depth map of the real image sample;

a first processing unit for obtaining a third depth map by up-sampling the second pixel coordinates and the second depth coordinates;

a second processing unit for obtaining a fourth depth map by up-sampling the third pixel coordinates and the third depth coordinates;

a third training unit for obtaining the coordinate optimization model by model training based on the first depth map, the second depth map, the third depth map and the fourth depth map.

Regarding the apparatus in the above embodiment, the specific manner in which each module performs the operations and the beneficial effects thereof have been described in detail in the embodiment related to the method, and will not be illustrated in detail here.

Figure 7:
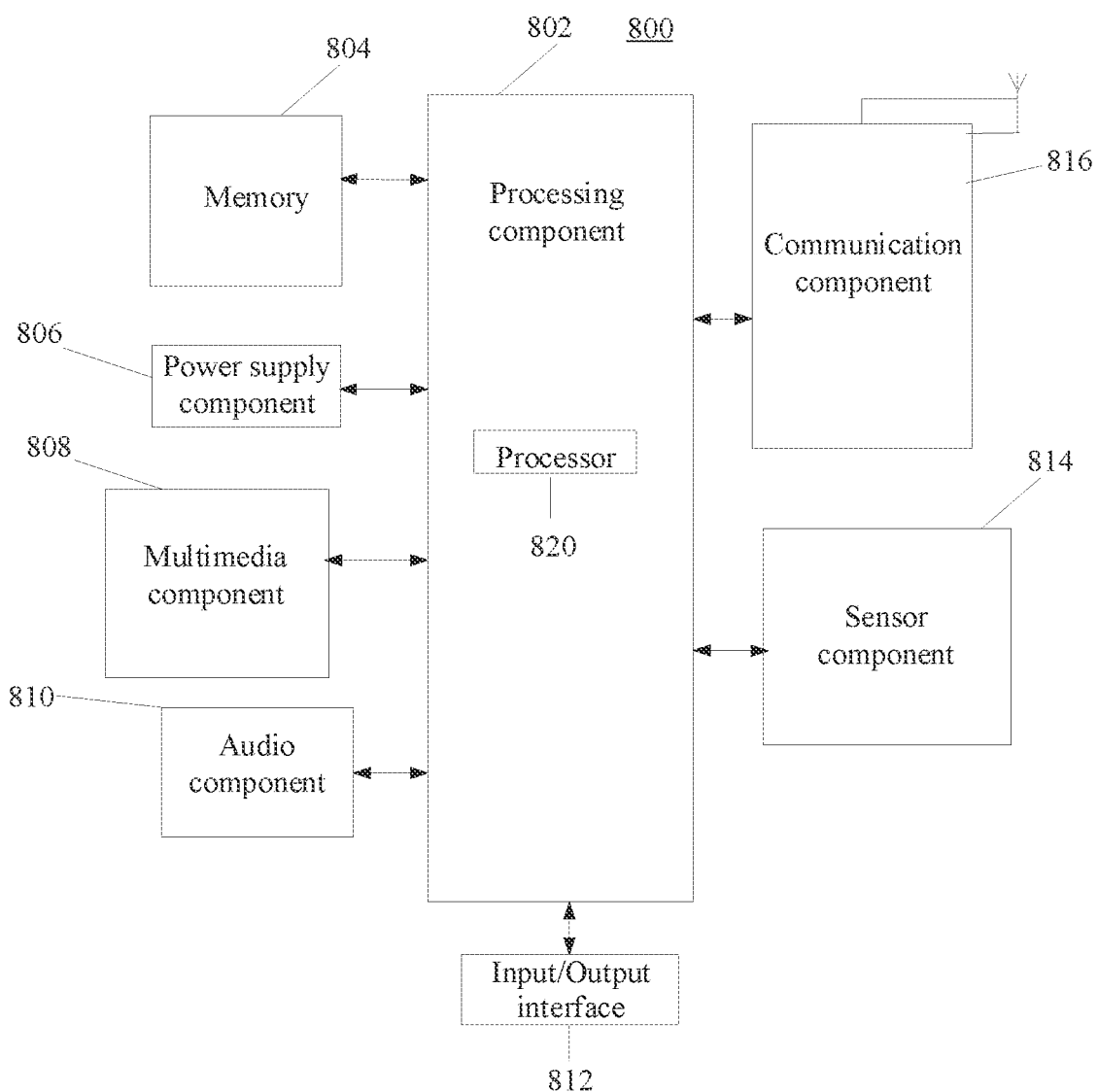
FIG. 7 is a block diagram of a first electronic device according to embodiments of the application.

FIG. 7 is a block diagram of a first electronic device 800 shown in the application. For example, the electronic device 800 may be a mobile phone, computer, digital broadcasting terminal, message transceiver, game console, tablet device, medical device, fitness device, personal digital assistant, or the like.

Referring to FIG. 7, the electronic device 800 may include one or more of a processing component 802, a memory 804, a power supply component 806, a multimedia component 808, an audio component 810, an Input/Output (I/O) interface 812, a sensor component 814, and a communication component 816.

The processing component 802 generally controls the overall operations of the electronic device 800, such as operations associated with display, phone call, data communication, camera operation, and recording operation. The processing component 802 may include one or more processors 820 to execute instructions to complete all or a part of the steps of the above method. In addition, the processing component 802 may include one or more modules to facilitate the interactions between the processing component 802 and other components. For example, the processing component 802 may include a multimedia module to facilitate the interactions between the multimedia component 808 and the processing component 802.

The memory 804 is configured to store various types of data to support the operations of the apparatus 800. Examples of the data include instructions of any application program or method operated on the electronic device 800, contact person data, phone book data, messages, images, videos, and the like. The memory 804 may be implemented by any type of volatile or nonvolatile storage device or a combination thereof, such as Static Random-Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk or optical disk.

The power supply component 806 provides power for various components of the electronic device 800. The power supply component 806 may include a power management system, one or more power supplies, and other components associated with generating, managing and distributing the power for the electronic device 800.

The multimedia component 808 includes a screen of an output interface provided between the electronic device 800 and the user. In some embodiments, the screen may include a Liquid Crystal Display (LCD) and a Touch Panel (TP). If the screen includes a touch panel, the screen may be implemented as a touch screen to receive input signals from the user. The touch panel includes one or more touch sensors to sense the touching, the sliding, and the gestures on the touch panel. The touch sensor may not only sense the boundary of the touching or sliding operation, but also detect the duration and pressure related to the touching or sliding operation. In some embodiments, the multimedia component 808 includes a front camera and/or a rear camera. When the apparatus 80 is in the operation mode such as shooting mode or video mode, the front camera and/or the rear camera may receive the external multimedia data. Each of the front camera and rear camera may be a fixed optical lens system or have the focal length and the optical zoom capability.

The audio component 810 is configured to output and/or input audio signals. For example, the audio component 810 includes a microphone (MIC). When the electronic device 800 is in the operation mode such as call mode, recording mode and voice recognition mode, the microphone is configured to receive the external audio signals. The received audio signals may be further stored in the memory 804 or transmitted via the communication component 816. In some embodiments, the audio component 810 further includes a speaker for outputting the audio signals.

The I/O interface 812 provides an interface between the processing component 802 and a peripheral interface module, where the above peripheral interface module may be a keyboard, a click wheel, buttons or the like. These buttons may include but not limited to: home button, volume button, start button, and lock button.

The sensor component 814 includes one or more sensors for providing the electronic device 800 with the state assessments in various aspects. For example, the sensor component 814 may detect the opening/closing state of the apparatus 800, and the relative positioning of the components (for example, the display and keypad of the electronic device 800). The sensor component 814 may further detect the position change of the electronic device 800 or a component of the electronic device 800, the presence or absence of contact of the user with the electronic device 800, the orientation or acceleration/deceleration of the electronic device 800, and the temperature change of the electronic device 800. The sensor component 814 may include a proximity sensor configured to detect the presence of nearby objects with no physical contact. The sensor component 814 may further include a light sensor, such as Complementary Metal Oxide Semiconductor (CMOS) or Charge-Coupled Device (CCD) image sensor, for use in the imaging applications. In some embodiments, the sensor component 814 may further include an acceleration sensor, a gyro sensor, a magnetic sensor, a pressure sensor, or a temperature sensor.

The communication component 816 is configured to facilitate the wired or wireless communications between the electronic device 800 and other devices. The electronic device 800 may access a wireless network based on a communication standard, such as WiFi, operator network (e.g., 2G, 3G, 4G or 5G), or a combination thereof. In an exemplary embodiment, the communication component 816 receives the broadcast signal or broadcast related information from an external broadcast management system via a broadcast channel. In an exemplary embodiment, the communication component 816 further includes a Near Field Communication (NFC) module to facilitate the short-range communications. For example, the NFC module may be implemented based on the Radio Frequency Identification (RFID) technology, Infrared Data Association (IrDA) technology, Ultra Wideband (UWB) technology, Bluetooth (BT) technology and other technologies.

In an exemplary embodiment, the electronic device 800 may be implemented by one or more Application Specific Integrated Circuits (ASICs). Digital Signal Processors (DSPs), Digital Signal Processing Devices (DSPDs), Programmable Logic Devices (PLDs), Field Programmable Gate Arrays (FPGAs), controllers, microcontrollers, microprocessors or other electronic elements to perform the above method.

In an exemplary embodiment, a non-transitory computer readable storage medium including instructions, for example, the memory 804 including instructions, is further provided, where the above instructions can be executed by the processor 820 of the electronic device 800 to complete the above method. For example, the non-transitory computer readable storage medium may be ROM, Random Access Memory (RAM), CD-ROM, magnetic tape, floppy disk, optical data storage device, or the like.

Figure 8:
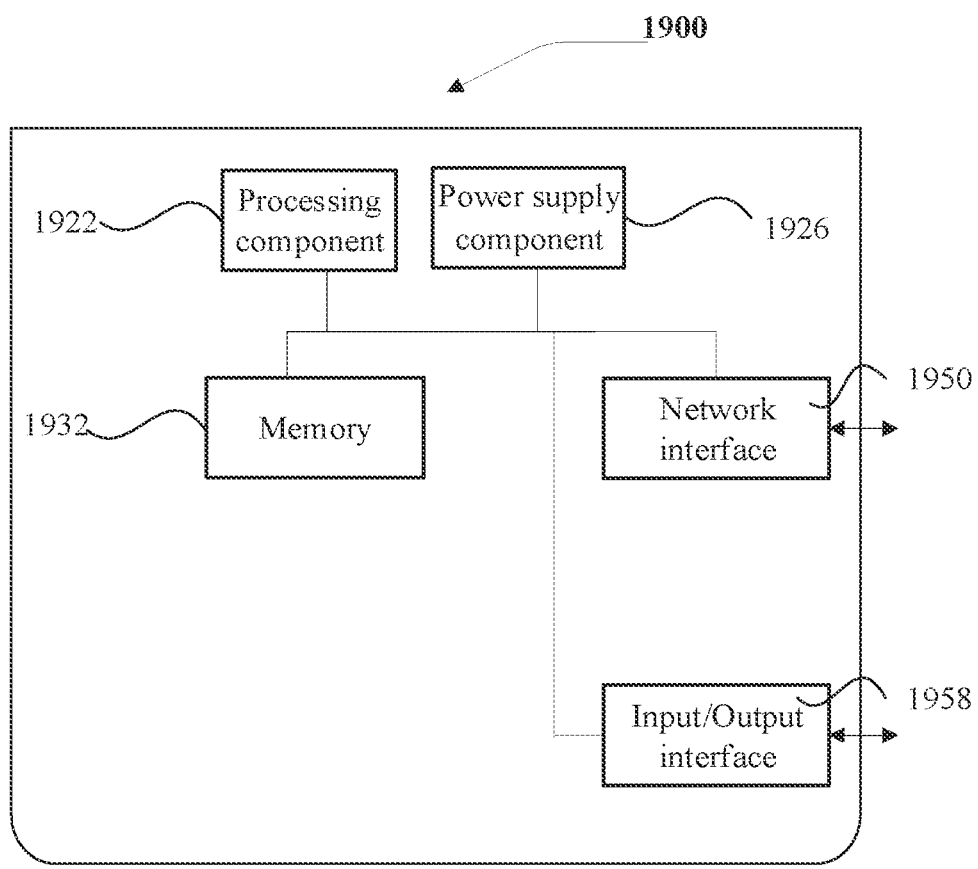
FIG. 8 is a block diagram of a second electronic device according to embodiments of the application.

FIG. 8 is a block diagram of a second electronic device 1900 shown in the application. For example, the electronic device 1900 may be provided as a server.

Referring to FIG. 8, the electronic device 1900 includes a processing component 1922 which further includes one or more processors, and the memory resource represented by a memory 1932 for storing the instructions (e.g., application program) that can be executed by the processing component 1922. The application program stored in the memory 1932 may include one or more modules, each of which corresponds to a set of instructions. In addition, the processing component 1922 is configured to execute the instructions to perform the above method.

The electronic device 1900 may further include a power supply component 1926 configured to perform the power management of the electronic device 1900, a wired or wireless network interface 1950 configured to connect the electronic device 1900 to a network, and an Input/Output (I/O) interface 1958. The electronic device 1900 may operate based on the operating system stored in the memory 1932, e.g., Windows, Server™, Mac OS X™, Unix™, Linux™, FreeBSD™ or the like.

Embodiments of the application further provide a computer program product. When the instructions in the computer program product are executed by a processor of a mobile terminal, the mobile terminal can perform the key point matching method described in any one of the above embodiments.

After considering the specification and practicing the invention disclosed here, those skilled in the art will readily come up with other embodiments of the application. The application is intended to encompass any variations, usages or applicability changes of the application, and these variations, usages or applicability changes follow the general principle of the application and include the common knowledge or customary technological means in the technical field which is not disclosed in the application. The specification and embodiments are illustrative only, and the true scope and spirit of the application is pointed out by the following claims.

It should be understood that the application is not limited to the precise structures which have been described above and shown in the figures, and can be modified and changed without departing from the scope of the application. The scope of the application is only limited by the attached claims.

What is claimed is:

1. A method gesture recognition, comprising:
acquiring a hand image;
extracting a first standard feature of a hand in the hand image based on a feature mapping model; the feature mapping model being obtained by training based on second standard features of hands in a synthesized image sample and a real image sample;
obtaining three-dimensional coordinates of multiple key points of the hand by processing the first standard feature;
determining a gesture of the hand based on the three-dimensional coordinates of the multiple key points;
wherein before extracting the first standard feature of the hand in the hand image based on the feature mapping model, the method further comprises: obtaining the feature mapping model;
wherein said that obtaining the feature mapping model comprises:
acquiring the synthesized image sample and the real image sample;
extracting a first feature of the synthesized image sample and a second feature of the real image sample;
calculating a distance between the first feature and the second feature;
determining the first feature and the second feature as second standard features in response to that the distance is less than or equal to a preset threshold;
obtaining the feature mapping model through model training based on the first feature, the second feature and the second standard features.

2. The method according to claim 1, wherein the first standard feature and the second standard feature comprise at least one of a hand skeleton structure and a relative length of hand skeleton.

3. The method according to claim 1, wherein said that obtaining three-dimensional coordinates of multiple key points of the hand comprising:
obtaining first pixel coordinates and first depth coordinates of multiple key points of the hand by processing the first standard feature based on a coordinate regression model, the coordinate regression model being obtained through training, and the first depth coordinates being normalized relative depths;
obtaining three-dimensional coordinates of each key point based on a first pixel coordinate and a first depth coordinate of each key point as well as camera parameters and root node coordinates.

4. The method according to claim 3, wherein the method further comprising: obtaining the coordinate regression model;
wherein said that obtaining the coordinate regression model comprises:
acquiring three-dimensional coordinates of hand key points of the synthesized image sample and two-dimensional coordinates of hand key points of the real image sample;

obtaining second pixel coordinates and second depth coordinates of each hand key point of the synthesized image sample as well as third pixel coordinates and third depth coordinates of each hand key point of the real image sample, by processing the second standard features;

obtaining the coordinate regression model by model training based on the second pixel coordinates, the second depth coordinates, the third pixel coordinates, the third depth coordinates, the three-dimensional coordinates of hand key points of the synthesized image sample and the two-dimensional coordinates of hand key points of the real image sample.

5. The method according to claim 4, wherein the method further comprising:

optimizing the second pixel coordinates, the second depth coordinates, the third pixel coordinates and the third depth coordinates based on a pre-trained coordinate optimization model.

6. The method according to claim 5, wherein the method further comprising: obtaining the coordinate optimization model;

wherein said that obtaining the coordinate optimization model comprises:

acquiring a first depth map of the synthesized image sample and a second depth map of the real image sample;

obtaining a third depth map by up-sampling the second pixel coordinates and the second depth coordinates;

obtaining a fourth depth map by up-sampling the third pixel coordinates and the third depth coordinates;

obtaining the coordinate optimization model through model training based on the first depth map, the second depth map, the third depth map and the fourth depth map.

7. An electronic device, comprising:

a processor;

a memory for storing instructions executable by the processor;

wherein the processor is configured to, when one or more programs are executed by one or more processors, cause the one or more processors to implement a process of:

acquiring a hand image;

extracting a first standard feature of a hand in the hand image based on a feature mapping model; the feature mapping model being obtained by training based on second standard features of hands in a synthesized image sample and a real image sample;

obtaining three-dimensional coordinates of multiple key points of the hand by processing the first standard feature;

determining a gesture of the hand based on the three-dimensional coordinates of the multiple key points;

wherein before extracting the first standard feature of the hand in the hand image based on the feature mapping model, the one or more processors are further configured to implement a process of: obtaining the feature mapping model;

wherein said that obtaining the feature mapping model comprises:

acquiring the synthesized image sample and the real image sample;

extracting a first feature of the synthesized image sample and a second feature of the real image sample;

calculating a distance between the first feature and the second feature;

determining the first feature and the second feature as second standard features in response to that the distance is less than or equal to a preset threshold;

obtaining the feature mapping model through model training based on the first feature, the second feature and the second standard features.

8. The electronic device according to claim 7, wherein the first standard feature and the second standard feature comprise at least one of a hand skeleton structure and a relative length of hand skeleton.

9. The electronic device according to claim 7, wherein the one or more processors are configured to implement a process of:

obtaining first pixel coordinates and first depth coordinates of multiple key points of the hand by processing the first standard feature based on a coordinate regression model, the coordinate regression model being obtained through training, and the first depth coordinates being normalized relative depths;

obtaining three-dimensional coordinates of each key point based on a first pixel coordinate and a first depth coordinate of each key point as well as camera parameters and root node coordinates.

10. The electronic device according to claim 9, wherein the one or more processors are further configured to implement a process of: obtaining the coordinate regression model;

wherein said that obtaining the coordinate regression model comprises:

acquiring three-dimensional coordinates of hand key points of the synthesized image sample and two-dimensional coordinates of hand key points of the real image sample;

obtaining second pixel coordinates and second depth coordinates of each hand key point of the synthesized image sample as well as third pixel coordinates and third depth coordinates of each hand key point of the real image sample, by processing the second standard features;

obtaining the coordinate regression model by model training based on the second pixel coordinates, the second depth coordinates, the third pixel coordinates, the third depth coordinates, the three-dimensional coordinates of hand key points of the synthesized image sample and the two-dimensional coordinates of hand key points of the real image sample.

11. The electronic device according to claim 10, wherein the one or more processors are further configured to implement a process of:

optimizing the second pixel coordinates, the second depth coordinates, the third pixel coordinates and the third depth coordinates based on a pre-trained coordinate optimization model.

12. The electronic device according to claim 11, wherein the one or more processors are further configured to implement a process of: obtaining the coordinate optimization model;

wherein said that obtaining the coordinate optimization model comprises:

acquiring a first depth map of the synthesized image sample and a second depth map of the real image sample;

obtaining a third depth map by up-sampling the second pixel coordinates and the second depth coordinates;

obtaining a fourth depth map by up-sampling the third pixel coordinates and the third depth coordinates;

obtaining the coordinate optimization model through model training based on the first depth map, the second depth map, the third depth map and the fourth depth map.

13. A non-transitory computer-readable storage medium, wherein when instructions in the storage medium are executed by a processor of an electronic device, the electronic device can perform a method:
acquiring a hand image;
extracting a first standard feature of a hand in the hand image based on a feature mapping model; the feature mapping model being obtained by training based on second standard features of hands in a synthesized image sample and a real image sample;
obtaining three-dimensional coordinates of multiple key points of the hand by processing the first standard feature;
determining a gesture of the hand based on the three-dimensional coordinates of the multiple key points;
wherein before extracting the first standard feature of the hand in the hand image based on the feature mapping model, the method further comprises: obtaining the feature mapping model;
wherein said that obtaining the feature mapping model comprises:
acquiring the synthesized image sample and the real image sample;
extracting a first feature of the synthesized image sample and a second feature of the real image sample;
calculating a distance between the first feature and the second feature;
determining the first feature and the second feature as second standard features in response to that the distance is less than or equal to a preset threshold;
obtaining the feature mapping model through model training based on the first feature, the second feature and the second standard features.

14. The non-transitory computer-readable storage medium according to claim 13, wherein the first standard feature and the second standard feature comprise at least one of a hand skeleton structure and a relative length of hand skeleton.

15. The non-transitory computer-readable storage medium according to claim 13, wherein said that obtaining three-dimensional coordinates of multiple key points of the hand comprising:
obtaining first pixel coordinates and first depth coordinates of multiple key points of the hand by processing the first standard feature based on a coordinate regression model, the coordinate regression model being obtained through training, and the first depth coordinates being normalized relative depths;
obtaining three-dimensional coordinates of each key point based on a first pixel coordinate and a first depth coordinate of each key point as well as camera parameters and root node coordinates.

16. The non-transitory computer-readable storage medium according to claim 15, wherein the method further comprising: obtaining the coordinate regression model;
wherein said that obtaining the coordinate regression model comprises:
acquiring three-dimensional coordinates of hand key points of the synthesized image sample and two-dimensional coordinates of hand key points of the real image sample;
obtaining second pixel coordinates and second depth coordinates of each hand key point of the synthesized image sample as well as third pixel coordinates and third depth coordinates of each hand key point of the real image sample, by processing the second standard features;
obtaining the coordinate regression model by model training based on the second pixel coordinates, the second depth coordinates, the third pixel coordinates, the third depth coordinates, the three-dimensional coordinates of hand key points of the synthesized image sample and the two-dimensional coordinates of hand key points of the real image sample.

17. The non-transitory computer-readable storage medium according to claim 16, wherein the method further comprising:
optimizing the second pixel coordinates, the second depth coordinates, the third pixel coordinates and the third depth coordinates based on a pre-trained coordinate optimization model.

18. The non-transitory computer-readable storage medium according to claim 17, wherein the method further comprising: obtaining the coordinate optimization model;
wherein said that obtaining the coordinate optimization model comprises:
acquiring a first depth map of the synthesized image sample and a second depth map of the real image sample;
obtaining a third depth map by up-sampling the second pixel coordinates and the second depth coordinates;
obtaining a fourth depth map by up-sampling the third pixel coordinates and the third depth coordinates;
obtaining the coordinate optimization model through model training based on the first depth map, the second depth map, the third depth map and the fourth depth map.

* * * * *